United States Patent [19]  [11]  4,340,192
Burris, III  [45]  Jul. 20, 1982

[54] REEL FOR ANCHORING WILD FOWL DECOYS

[76] Inventor: James O. Burris, III, 251 Clark, Clarksdale, Miss. 38614

[21] Appl. No.: 130,252

[22] Filed: Mar. 14, 1980

[51] Int. Cl.³ ............................................. B65H 75/48
[52] U.S. Cl. ....................................... 242/107.6; 43/3
[58] Field of Search ............. 242/107.6, 107.7, 107.12, 242/84.3, 107.4 R, 107.4 E, 99; 43/3, 2; 188/82.7; 254/357, 376

[56] References Cited

U.S. PATENT DOCUMENTS

| | | | |
|---|---|---|---|
| 906,696 | 12/1908 | Emigh | 242/107.12 |
| 1,789,649 | 1/1931 | Gazecki et al. | |
| 2,523,811 | 9/1950 | Buehl | 43/3 |
| 2,539,727 | 1/1951 | Clark | |
| 2,577,553 | 12/1951 | White, Jr. | 242/84.3 X |
| 2,577,554 | 12/1951 | White, Jr. | 242/84.3 X |
| 2,577,555 | 12/1951 | White, Jr. | 242/84.3 X |
| 2,747,814 | 5/1956 | Taylor | 242/107 |
| 2,917,857 | 12/1959 | Muszynski | 43/3 |
| 3,021,090 | 2/1962 | Becker | 242/107.7 |
| 3,059,368 | 10/1962 | Wortman | 43/3 |
| 3,079,719 | 3/1963 | Muszynski | 43/3 |
| 3,590,656 | 7/1971 | Lloyd, Jr. | 242/107.7 X |
| 4,056,890 | 11/1977 | Dembski | 43/3 |

Primary Examiner—John M. Jillions
Attorney, Agent, or Firm—Rogers, Eilers & Howell

[57] ABSTRACT

A reel for a duck decoy or the like, comprises a first hub having a second hub mounted and biased for rotary movement thereto. The second hub has diametrically opposed notches, each notch has two edges, and each notch has a circumferential groove located a short distance from the periphery of the hub. Each notch has a tab projecting from the outer edge of the second hub into the notch, forming a slot between the tab and an edge of the notch leading to the groove. A lock pin is pivotally mounted to the first hub so that it can pivot into the notch, thence pivot into the slot as the second hub rotates and thence slide into the groove as the second hub rotates. When the pin is in the groove it locks the second hub against rotary movement relative to the first hub in the direction of spring bias. The lock pin can be moved from the locked position to the unlocked position. The reel has a cord having a first end tied to the second hub so that the end does not pass around either of the notches. The cord winds around the reel and passes through an eyelet mounted to the first hub, thence through a loop at the outer end of the lock pin, and has its second end tied to an anchor weight. The anchor can be fed out into water by the unwinding of the cord.

9 Claims, 5 Drawing Figures

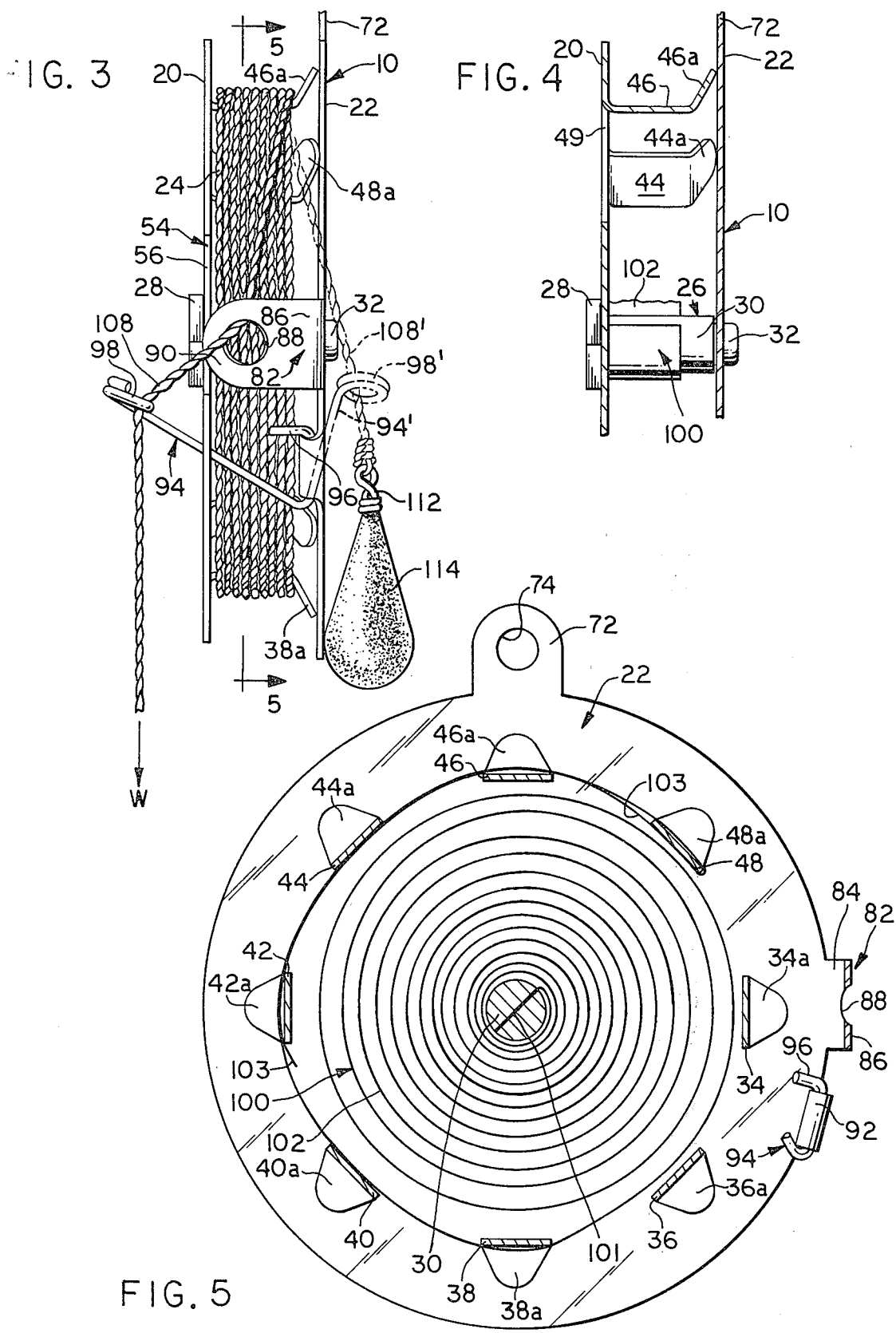

REEL FOR ANCHORING WILD FOWL DECOYS

FIELD OF THE INVENTION

The present invention is concerned with means for anchoring hunting decoys, such as duck or geese decoys, in water, while a hunter in a nearby location hunts. It is more particularly concerned with reels used for suspending an anchor weight into the water for holding the decoy against movement from a chosen location.

One type of reel previously used for fishing has a leaded weight which is suspended from a length of cord wound about the reel. This reel has a first hub having a second hub rotatably mounted to it, with a coiled spring biasing the first and second hubs so as to rotate the second hub relative to the first hub in the same manner as is disclosed in the description for the present invention. In that reel the second hub has a pair of diametrically opposed notches, each notch having a straight longer edge and a straight shorter edge. A lock pin is pivotally mounted to the first hub so that the pin can pivot into either of the second hub notches and rest in the corner of the notch formed by the junction of the long and short notch edges to lock the second hub against movement in the direction of spring bias. The cord is wound about the second hub, with the inner end of the cord tied about one of the notches and through a hole in the side of the second hub, which leaves the cord exposed for rubbing against the lock pin. The cord winds about the second hub and passes through an eyelet mounted to the first hub and thence passes through a loop at the outer end of the lock pin. From this point the cord can depend down into the water where it has a leaded anchor attached at its other end to act as an anchor weight. With this device, when the anchor cord length is set and the pin is in one of the notches, the pin can be easily disengaged from the notch by being accidently stricken and moved away from the hub. When this disengagement occurs, the second hub, being biased by the coiled spring, rotates quickly to rewind the cord. This sudden accidental rewinding can occur by jarring after the cord length has been extended to the length desired. The sudden recoil of the cord can hurl the anchor rapidly to cause injury should the anchor strike someone.

In other devices, there are duck decoys with reels which feed out a length of cord. One such decoy has an anchor with a spring biasing a part of the reel. The reel is held against unwinding by a pin mounted to the decoy which engages gear teeth associated with the reel. Another type of decoy has a spring operated reel with a crank handle which rotates the reel to extend the anchor cord to a selected depth. These other devices do not provide the simplicity in design provided by the present device.

SUMMARY OF THE INVENTION

The present invention improves over the prior art. It comprises a reel having a first hub to which is rotatably attached a second hub, the second hub being biased to rotate relative to the first hub, as in the device discussed first aforesaid. The first hub has an eyelet to receive the outer end of a cord wound about the reel, and it also has a lock pin pivotally attached thereto, the pin having a loop at its outer end to receive the outer end of the cord, as in the device discussed first aforesaid. To prevent accidental disengagement of the lock pin, the present invention has a pair of novel notches diametrically spaced on opposite sides of the second hub. Each notch has a longer wall and a shorter wall, with a groove extending approximately circumferentially from the outer end of the shorter notch wall into the hub, the groove being sized to snugly receive the lock pin. Each notch also has a tab which projects along the outer edge of the notch and also into the notch so that a slot is formed within the notch between the tab and the shorter edge of the notch. To lock the two reel hubs against rewinding, the lock pin is pivoted into the notch, then the second hub is rotated relative to the first hub to move the pin past the tab to the notch corner. The pin is then pivoted into the slot, and next the second hub is rotated to move the pin into the groove. When the lock pin is in the groove it locks the second hub relative to the first hub against rotation in the direction of spring bias. The pin cannot be forced out of the notch by moving the pin outward from the hub, whereas in the device first discussed aforesaid, such movement would move the lock pin out of the notch and thus cause the second hub to be unlocked so that it would suddenly rewind the cord. Furthermore, with the present invention the lock pin cannot be moved out of the notch by moving it out of the groove, as the tab will block any such movement out of the notch. The only way in which the lock pin can be disengaged is by first rotating the second hub relative to the first hub to remove the lock pin from the groove, thence pivoting the lock pin out of the slot, thence again rotating the second hub relative to the first hub to slide the pin past the tab, thence again pivoting the lock pin outward from the notch.

The present device thus prevents the sudden and unexpected accidental rewinding of the cord which can occur when the cord length for the anchor is being set, or can occur when the decoy is afloat, or when the decoy is removed from water. Preventing accidental cord recoil saves times in not having to again rewind the cord; saves wear and tear on the reel and its components, and prevents a decoy from being lost due to its anchor being accidentally taken up. Injuries caused by the dangerous sudden projection of the anchor are prevented.

Additionally, the present device has its inner cord end secured so that the cord does not extend across either of the edges of the notch, as done in the device discussed first aforesaid. This adds life to the cord, as the rubbing of the lock pin on the cord in the notch can cause unnecessary wear and tear on the cord.

Yet the present inventions' locking and safety features are provided with fewer parts and simpler design than other decoy reels. Because of the simplicity in design, production and maintenance are enhanced.

DESCRIPTION OF THE DRAWINGS

FIG. 3 is a rear elevation taken on the lines 3—3 of FIG. 2, showing the reel with the head mount shown broken;

FIG. 4 is a section of part of the reel taken on the lines 4—4 of FIG. 2, with the cord not shown, with the spring shown broken and the head mount shown broken; and FIG. 5 is a section taken on the line 5—5 of FIG. 3, with the cord and anchor not shown.

DESCRIPTION OF THE PREFERRED EMBODIMENT

Figure 1:
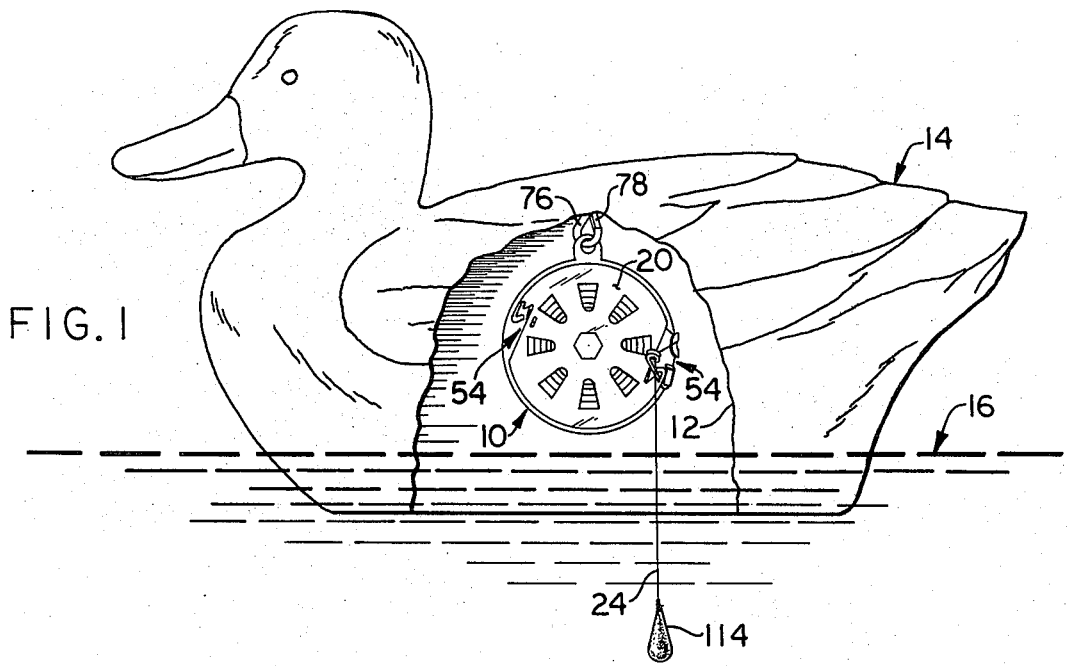
FIG. 1 is a side elevation of the reel mounted within a duck decoy floating on water, with the anchor suspended from the reel.

The reel 10, as seen in the drawings, is mounted in the cavity 12 of a duck decoy 14 floating in water 16. The decoy has a buoyancy that positions the reel above the water line. Focusing now on the reel 10, the reel comprises a smaller steel hub plate 20, and a larger steel hub plate 22 of slightly larger diameter than hub 20. A roll of cord 24 is mounted between the hubs. The hubs 20 and 22 are secured together by a rivet 26 which has an enlarged hexagonal head 28, a slotted cylindrical intermediate section 30, and a smaller slotted end 32. The rivet extends through a circular bore in the center of hub 20. The slotted rivet end 32 extends through a pair of adjacent semi-circular bores in hub 22 and the two tips of end 32 are crimped together to lock around the hub strip separating the semi-circular bores, to hold hub 22 against the shoulder of the intermediate rivet section 30.

The smaller hub 20 has eight equally spaced prongs 34, 36, 38, 40, 42, 44, 46 and 48 which are all formed integrally from the hub 20 by stamping to leave voids 49 in the side of hub 20. The prongs all extend perpendicular to hub 20 for a distance, and thence bend to extend outwardly into respective tongues 34a, 36a, 38a, 40a, 42a, 44a, 46a, and 48a. The prongs, with their tongues, space the two hubs apart.

Figure 2:
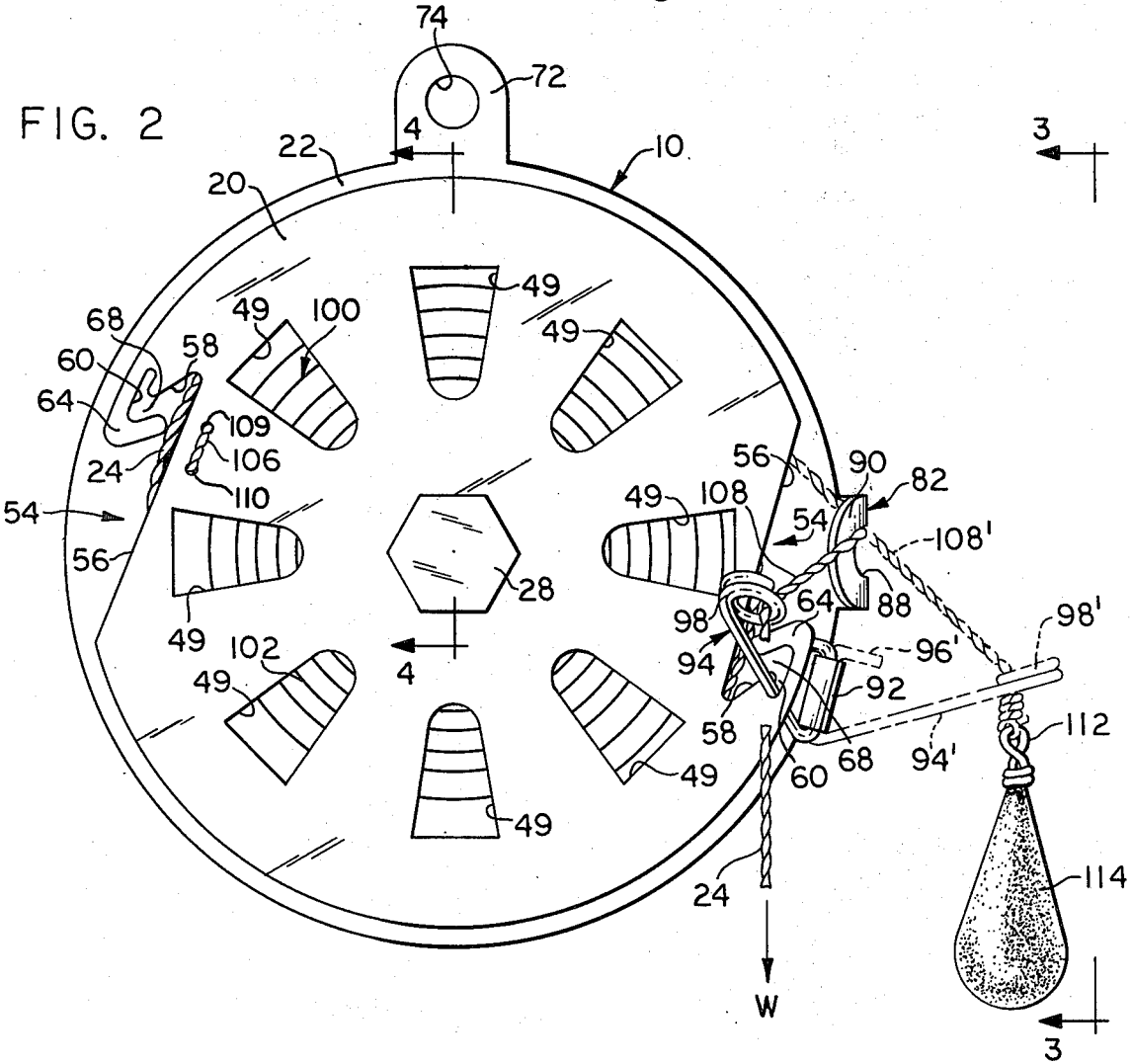
FIG. 2 is a side elevation of the reel isolated from the decoy, with solid line showing the locking pin in locked position, and phantom lines showing the locking pin in unlocked position.

As shown in FIG. 2, the hub 20 has a novel locking means for locking the reel hubs with a lock pin to be described, comprising a pair of notches 54 which are spaced diametrically on opposite sides of the hub, which each extend inwardly from the outer edge of hub 20 and which each open towards the outer edge of the hub 20. Each notch 54 has a longer wall 56, and a shorter wall 58, with a lock groove 60 extending into hub 20 approximately circumferentially from the outer end of shorter wall 58. The locking means further comprises a tab 64 associated with each notch. Tab 64 is integral with hub 20 and is angle shaped. Each tab 64 has a first leg that extends circumferentially along the outer edge of hub 20 across the outer edge of the opening of notch 54, and a second foot end connected to the leg that projects in a direction inwardly from the hub edge into the notch 54, so that a slot 68 is formed between the tab 64 and the shorter wall 58 of the notch 54. The tab 64 and the part of the hub 20 on the outside of the groove 60, form a slanted inverted V shape. The leg and foot of each tab 64 act to partially block the opening of notch 54.

Turning now to the larger hub 22, it has extending integrally from its top a mount head 72 having a hole 74 to receive a support hook 76 supported in the duck decoy cavity, with hook 76 having a corresponding spring catch 78 releasably closing the open end of the hook 76, for the mounting of the reel 10.

Hub 22 has an eyelet flange 82 formed integrally with hub 22. Flange 82 projects first outwardly from the edge of hub 22 into a short hip section 84, and thence bends perpendicular to hub 22 across the end of the reel into a leg section 86 having an aperture 88 through which the cord 24 is threaded. The end of leg 86 is bent slightly towards the reel into a foot 90.

Beneath eyelet 82, hub 22 has an integral sleeve 92 rolled so that the sleeve is of a diameter to rotatably receive a pivoting section of a steel lock pin 94. The lock pin 94 has one end that is bent into a U-shape so that the closed end of the U extends through sleeve 92, and the end 96 of the pin is bent to provide a stop to prevent the pin from being pulled out of the sleeve 92. Pin 94 extends from its connection to sleeve 92 to its other end which is coiled into a loop 98 of circular shape to receive cord 24. The pin 94 is of such diameter to be slidingly received within lock groove 60, as shown clearly in FIG. 2, to hold the hub 20 locked against counterclockwise motion (as viewed looking at FIG. 2) relative to hub 22, and also to hold pin 94 from sliding to the corner formed by the inner ends of the notch longer wall 56 and shorter wall 58. With the pin 94 so mounted within sleeve 92, the pin 94 can pivot from the unlocked position shown as 94' to the locked position shown in solid lines as 94, when the hub 20 is rotated as will be described.

A flat coil spring 100 has its inner end 101 bent flat to fit within the slot in rivet section 30, and thence spring 100 coils into a section 102 about rivet 26, as seen in FIG. 5, until it extends on the outside of prong 38. Thence spring section 102 goes under prong 40, thence outside prong 42 and under prong 44 and then outside prong 46 until it reaches prong 48. At prong 48, spring 100 first goes over the top of that prong and then is bent into a section 103 that extends in the opposite direction to go under prong 48, and thence extends flush against spring section 102 to go outside of prong 46, thence inside prong 44, and thence on the outside of prong 42 so that it terminates just past prong 42. The pressure between the spring sections 102 and 103 and the prongs which they weave about, hold the end section 103 in place relative to those prongs so that the tension in spring 100 biases hub 20 relative to hub 22 to rotate hub 20 about rivet 26 in a counterclockwise direction relative to hub 22 (from the perspective of FIG. 2). In locked position, the pin 94 holds hub 20 against this rotary movement.

The cord 24 has a first end 106 secured to hub 20 by extending end 106 through a pair of openings 109 and 110 in hub 20 and tying end 106 to itself on the inside of hub 20 to hold end 106 fixed to hub 20. From end 106, cord 24 winds several times outside the prongs of hub 20 and finally extends into the other second cord end 108 which passes first through eyelet aperture 88 and thence through pin loop 98, and is then tied to the eyelet 112 of a lead anchor weight 114. When the hub 20 is not locked by pin 94, the biasing force of spring 100 rotates hub 20 to wind cord 24 about hub 20. The hubs 20 and 22, rivet 26, pin 94, and spring 100 are made of a non corrosive metal, such as stainless steel, so as not to be corroded by exposure to moisture.

OPERATION

For purposes of illustration, discussion will begin with the reel 10 outside the decoy with the lock pin 94 in the locked position shown in FIG. 2 in solid lines, and with the anchor weight 114 unextended.

To set the cord 24 to the appropriate length for extension of the anchor 114 into the water, the fingers of the left hand grasp about the edge of hub 22 and the right hand fingers grasp the cord end 108 at a point just below pin loop 98, and pull the cord 24 slightly through the loop 98 and eyelet aperture 88. This causes hub 20 to rotate slightly clockwise relative to hub 22 sufficiently enough so that pin 94 is no longer contained within groove 60. Then, with the pin 94 at the closed end of slot 68, cord end 108 is pulled inwardly from the hub 20 edge towards the notch corner formed by the intersection of longer wall 56 and shorter wall 58, so that the pin travels out of slot 68. As the pin 94 travels out of slot 68, the right hand reduces tension on cord end 108 and cord 24 slightly to allow spring 100 to rotate hub 20 slightly counterclockwise relative to hub 22 until pin 94 reaches the notch corner.

From this point, the right hand pulls cord 24 in a direction substantially aligned with longer notch wall 56, to rotate hub 20 clockwise relative to hub 22, so that pin 94 slides along longer wall 56 until tab 64 is rotated beneath pin 94. Then the right hand pulls cord end 108 outward from notch 54 which pivots the lock pin about sleeve 92 to its position at 94'. Next, the cord end, shown at 108', is pulled downward to rotate hub 20 clockwise against the resistance of spring 100, so that a length of cord desired is pulled through eyelet aperture 88 and the pin loop at 98'.

The length of cord pulled depends upon the depth of the water in which the decoy is placed. The operator selects one of the notches 54 for the placing of the lock pin 94, to allow extension of the cord length desired, and with the left hand grasps the edges of hubs 20 and 22 to hold the hubs still so that the selected notch 54 is then adjacent the lock pin 94'. Then the right hand grasps cord 24 at a point within one inch of pin loop 98, and the cord 24 is pulled towards the selected notch 54 to pivot the lock pin into the notch until it contacts the longer notch wall 56 at a position above tab 64. The operator's left hand then releases hub 20 and the right hand releases tension on cord 24 slightly so that hub 20 rotates counterclockwise to allow tab 64 to rotate above the lock pin 94 until the lock pin is in the notch corner. After that, the cord is pulled away from hub 20 to pivot the pin 94 about sleeve 92 into slot 68, and as the pin goes into slot 68 the force of pin 94 against the short wall 58 rotates hub 20 slightly clockwise until pin 94 is at the closed end of slot 68 and above the open end of groove 60. From this position, the tension on cord 24 is slackened so that spring 100 rotates hub 20 counterclockwise to allow groove 60 to receive pin 94 in the closed end of the groove, as shown in solid lines in FIG. 2. In this position, the anchor weight extends in the direction shown by the arrow as W, and the lock pin 94 resists the counterclockwise force of the spring 100 and prevents hub 20 from rotating counterclockwise relative to hub 22.

With the pin 94 locked in groove 60, the pin will not be jarred from engagement with hub 20 if the decoy is struck or jarred during operation or handling, as movement of the pin 94 out of notch 54 is blocked by tab 64 and by the part of hub 20 surrounding groove 60. The pin does not disengage hub 20 if a clockwise force is applied to the hub 20 because of the blocking by tab 64, and the pin cannot move out of notch 54 by outward movement from the hub 20 because of the blocking provided by the hub 20 portion surrounding the groove, and the blocking by the tab.

After the pin 94 is locked into position for the length of cord desired, the operator places the reel 10 into the decoy cavity, and passes hook 76 through hole 74 of mount head 72 so that spring catch 78 closes the hook opening. The decoy 14 is then placed in the water for hunting, with the cord 24 depending from the cavity 14 so that the anchor 114 descends to the depth selected such as illustrated in FIG. 1. The anchor restrains the decoy movement in water, and allows the hunter to arrange one or more decoys in a desired pattern.

After hunting, the hunter lifts the decoy from the water, and unhooks reel 10 from hook 76 by pressing catch spring 78 towards the hook to allow passage of the mount head 72 off the hook.

To rewind the cord 24, the pin 94 is moved out of notch 54 to the position 94', in the manner previously described, with the right hand holding the cord to prevent its recoil. With the pin positioned at 94', the cord is held with a desired degree of tautness to allow the force of spring 100 to rotate hub 20 counterclockwise at a selected rate of speed to rewind the cord. When the cord is rewound to the position desired, the pin is moved back in the manner previously described to the position shown in solid lines at 94 in FIG. 2.

The tab 64 and groove 60 thus prevent the sudden and unexpected accidental rewinding of the cord, which saves time in not having to again unwind the cord; which saves wear and tear on the reel, the spring, the cord, and the lock pin; and which acts to prevent accidents caused by the dangerous sudden and rapid recoil projection of the anchor weight.

The securing of cord end 106 in the manner described keeps the cord from being cut by the rubbing of pin 94 against it, which adds life to the cord.

One can thus set anchors for a number of decoys in a short period of time without having to worry about sudden recoil of the weight during the selection of anchor depth, during the operation of the decoy in water, or during the removal of the decoy from the water.

The operation has been described with the cord being unwound and wound with the reel 10 disassociated from the decoy. However, if desired, the cord feed out can be set after the reel is mounted within the decoy, if the hand is sized to be received comfortably in decoy cavity 12.

The above description has been given with regard to a duck decoy, though the reel may be used for other hunting decoys, such as for geese. The lock tab 64, the groove 60, and the notch can take other shapes than the shapes shown, although the shapes shown are preferred.

The novel reel thus provides secure and safe locking to prevent accidental recoil of the cord and anchor. Yet such locking is provided with a minimum of moving parts, and with a notch arrangement that can be easily manufactured by stamping. The use of a minimum number of parts not only allows simplicity and efficiency in production, but reduces maintenance and repair expenses and time.

Various changes and modifications may be made within this invention as will be readily apparent to those skilled in the art. Such changes and modifications are within the scope and teaching of this invention as defined by the claims appended hereto.

What is claimed:

1. A reel for the winding and unwinding of cord about the reel, for use in anchoring floating animal decoys, the reel comprising:
   (a) a first hub having an eyelet for receiving cord therethrough;
   (b) a second hub mounted to rotate relative to the first hub;
   (c) means for biasing the second hub rotatably relative to the first hub;
   (d) a spool-like support structure located between the first and second hubs for mounting a wound cord, said spool-like structure connected to the second hub to rotate therewith;

(e) a lock pin pivotally mounted to the first hub to pivot about its axis in a plane substantially co-planar with the plane of the first hub, so that the pin can pivot towards the second hub for engagement with the second hub, and pivot away from the second hub, the lock pin having a loop for receiving the cord which extends from the eyelet with the pin extending across the spool-like structure when the pin is engaged to the second hub; and (f) means for locking the first hub to the second hub with the lock pin, comprising: the second hub having an outer edge, the second hub having a notch with a wall extending inwardly from the second hub outer edge so that the notch opens towards the outer edge of the second hub; and a tab projecting from the outer edge of the second hub towards the interior of the second hub to partially block the notch opening with the tab projecting in a direction from the outer edge of the second hub into the notch to form a slot between the tab and the notch wall, said slot sized to allow passage of the lock pin, so that when the lock pin is pivoted towards the second hub to be positioned within the notch to lock against rotary movement of the second hub relative to the first hub, the tab obstructs movement of the pin out of the notch.

2. The structure of claim 1 wherein the tab has an angular shape.

3. The structure of claim 1 further comprising the second hub having a groove sized to receive the pin, the groove opening into the slot, with the tab adjacent the opening of the groove and between the notch opening and the groove opening.

4. The structure of claim 3 wherein the tab and the part of the hub on the outside of the groove form a V type shape.

5. The structure of claims 3 or 1 wherein the tab is integral with the second hub.

6. The structure of claims 3 or 1 wherein the means for locking are provided at two positions on the second hub.

7. A reel for the winding and unwinding of cord about the reel for use in anchoring floating animal decoys, the reel comprising:

(a) a first hub;

(b) a second hub mounted to rotate relative to the first hub;

(c) means for biasing the second hub rotatably relative to the first hub;

(d) a lock pin associated with the first hub; and (e) means for locking the first hub to the second hub with the lock pin comprising:

(i) the second hub having an outer edge, the second hub having a notch with a wall extending inwardly from the second hub outer edge so that the notch opens towards the outer edge of the second hub;

(ii) a tab integral with the second hub and projecting from the second hub into a first tab leg portion that extends across the outer edge of the notch opening, and a second tab foot portion projecting into the notch opening so that the first and second tab portions each partially block the notch opening;

(iii) a slot formed between the tab foot portion and the notch wall, said slot sized to allow passage of the lock pin and, (iv) the second hub having a groove sized to receive the lock pin, the groove opening into the slot to allow the lock pin to be moved from the groove to the slot.

8. A reel for the winding and unwinding of cord about the reel, for use in anchoring floating animal decoys, the reel comprising:

(a) a first hub;

(b) a second hub mounted to rotate relative to the first hub;

(c) means for biasing the second hub rotatably relative to the first hub;

(d) a lock pin pivotally mounted to the first hub to pivot towards and away from the second hub; and (e) means for locking the first hub to the second hub with the lock pin, comprising: the second hub having an outer edge, the second hub having a notch with a wall extending inwardly from the second hub outer edge so that the notch opens towards the outer edge of the second hub; and a tab projecting from the second hub to partially block the notch opening, with the tab projecting in a direction from the outer edge of the second hub into the notch to form a slot between the tab and the notch wall, said slot sized to allow passage of the lock pin, the second hub having a groove sized to receive the pin, the groove opening into the slot, with the tab adjacent the opening of the groove and between the notch opening and the groove opening, so that when the lock pin is pivoted to be positioned within the notch to lock against rotary movement of the second hub relative to the first hub, the tab obstructs movement of the pin out of the notch.

9. The structure of claim 8 wherein the tab and the part of the hub on the outside of the groove form a V-type shape.

* * * * *